United States Patent Office 3,252,951
Patented May 24, 1966

3,252,951
POLYMERIZATION OF ACRYLONITRILE POLYMERS IN THE PRESENCE OF CONDENSED PHOSPHORUS ACIDS
Carlhans Süling, Heinz Gröne, and Egon Kuntz, Leverkusen, and Herbert Marzolph, Dormagen, Germany, assignors to Farbenfabriken Bayer Aktiengesellschaft, Leverkusen, Germany, a corporation of Germany
No Drawing. Filed Jan. 18, 1962, Ser. No. 167,176
Claims priority, application Germany, Feb. 20, 1961, F 33,243
5 Claims. (Cl. 260—85.5)

The present invention relates to a process for the production of acrylonitrile polymers with particularly advantagaous properties.

It is known to polymerize acrylonitrile by itself or in admixture with other vinyl compounds in aqueous solution, suspension or emulsion with the aid of radical-yielding activators, such as hydrogen peroxide, persulfates, perphosphates, perborates and azo compounds, or with the aid of redox systems, such as mixtures of chlorate and bisulfite, persulfate and pyrosulfite, and of perphosphate and bisulfite. The polymers obtained in this way are of considerable interest for the production of shaped articles, such as filaments and fibers.

The polymerization is usually effected in the acid range at a pH-value which is kept as constant as possible. The pH-value is generally adjusted by means of sulfuric acid. For further activation, there are also added ionic heavy metal compounds, especially those of iron, provided these metals are not already entrained in sufficient quantity by the other starting substances, or formed for example by attack of the acid on the metallic parts of the apparatus.

It is very important both for the quality of the polymers and for the shaped articles manufactured therefrom more especially filaments and fibers, that the initially produced polymer should have a color tone which is as light as possible and should also have the lowest possible tendency to yellowing and to discoloration under the effect to relatively high temperatures (thermostability), such as occur for example during the spinning and further processing. It has been found that these properties are influenced both by the acid used for adjusting the pH-value and also by the heavy metal ions which are present. The initial color tone and thermostability of the polymers is particularly strongly impaired by iron ions under the conditions so far known. On the other hand, it is just these iron ions which are frequently used for the additional activation of polymers of acrylonitrile, because these already show a high activating effect in a very small dosage. When polymerizing on a commercial scale in vessels which contain iron, iron ions are in any case always present.

It has been proposed to polymerize acrylonitrile in the presence of orthophosphoric or pyrophosphoric acid and with addition of copper ions, but with strict exclusion of other heavy metal ions, more especially iron ions (see German Patent 1,040,242). It is extremely difficult technically to achieve such a strict exclusion of heavy metal ions, especially iron ions, this necessitating inter alia the use of very pure starting materials and foregoing the use of those reaction vessels which contain iron or even only give off traces of iron compounds.

It is an object of the present invention to prepare acrylonitrile polymers which have a light initial color tone and a good thermostability. Another object of the invention is to provide a process with which the acrylonitrile polymers are obtained with good yields and with the use of short reaction times. In accordance with yet another object of the invention, substances which are easily available are used as additives during the polymerization. Other objects will be apparent from the following description and the examples.

These objects are accomplished by polymerizing acrylonitrile, if desired in mixture with other vinyl compounds, in an aqueous medium with the aid of radical-forming activators at pH-values below 7, by working in the presence of condensed phosphoric acids which contain at least three phosphorus atoms per molecule and in the presence of heavy metal compounds.

It must be considered as surprising that acrylonitrile polymers with the said good properties are obtained when carrying out polymerization according to the invention in the presence of condensed phosphoric acids and heavy metal compounds. In accordance with the state of the art it had to be assumed, that a light color tone could only be obtained if heavy metal compounds were excluded. Having regard to the prior known polymerization process which uses orthophosphoric acid or pyrophosphoric acid and copper, with strict exclusion of other heavy metal ions, it is surprising that despite the presence of any arbitrary heavy metal compounds, polymers with the said good properties are obtained, when using specific condensed phosphoric acids. The particularly surprising and advantageous feature of the process according to the invention lies in the fact that iron compounds can be present during the polymerization and that consequently it is also possible to carry out polymerization in vessels which contain iron. The presence of heavy metal compounds, more especially iron, is of especial advantage, because when using redox systems as activating agents, the heavy metal compounds lead to a controlled reaction, a high yield and an adjustment of molecular weight which is desirable from the point of view of commercial processing of the product.

Suitable as monomers for copolymerization with acrylonitrile are all vinyl compounds which are usually employed in conjunction with acrylonitrile, more especially those which are used for the production of acrylonitrile polymers for spinning of synthetic fibers. The following monomers are to be mentioned as examples: methacrylonitrile, acrylic and methacrylic acid esters, acrylic and methacrylic acids, vinyl chloride, vinylidene chloride, vinyl esters and unsaturated sulfonic acids, such as styrene sulfonic acid, unsaturated sulfates, such as β-methacryloylamino-ethanol sulfuric acid ester, unsaturated disulfonimides, such as those described in patent application Serial Number 8,925, now patent No. 3,052,656, as well as unsaturated basic polymerizable compounds, such as vinyl pyridine, O-acryloylaminoethanol and N-methacryloyl-N′-dimethyl ethylene diamine. Generally, the acrylonitrile polymers obtainable according to the invention contain at least 80% of combined acrylonitrile.

The polymerization can take place in the presence of polymers which already contain acid groups, such as sulfonic acid groups and sulfate groups and even disulfonimide groups.

As phosphoric acids suitable for the process of the invention, all oxygen acids of pentavalent phosphorus which contain at least three phosphorus atoms in the molecule may be employed. It is not necessary to use the pure phosphoric acids, it being possible also to use mixtures of these acids, such as those formed for example when such compounds are prepared commercially. Such phosphoric acids are described in detail and characterized for example in "Phosphorus and Its Compounds, vol. I, pages 418–477 and pages 770–790, Interscience Publ. Inc., New York, 1958." The production of the condensed phosphoric acids used according to the invention is carried out by methods known per se, for example by dehydration of orthophosphoric acid. Examples of such condensed phosphoric acids are polyphosphoric acid, metaphosphoric acid and isometaphosphoric acid.

The compounds of all heavy metals, in particular of iron and of vanadium and copper, may be considered as heavy metal compounds for the process according to the invention. The valency and the nature of the anion is of no importance in this respect. Divalent soluble iron salts are preferably used, for example ferrous sulfate.

The polymerization of the acrylonitrile and of the vinyl compounds which may be present at the same time takes place in a manner known per se. The temperatures are between 10° C. and 80° C., advantageously 20° C. and 70° C. Water serves as polymerization medium. The pH-value is preferably between 1 and 7, advantageously between 1.3 and 5. In order to acidify the reaction mixture, other organic and/or inorganic acids can be used as well as the phosphoric acids used according to the invention, these additional acids being for example sulfuric, nitric, orthophosphoric, perchloric, amidosulfonic, toluenesulfonic and chlorinated acetic acids.

The condensed phosphoric acids are used in quantities of 0.001 to 10 parts by weight, advantageously 0.005 to 2 parts by weight, calculated on 100 parts by weight of monomer which is to be polymerized. The heavy metal compounds present are used in quantities between 1 and 250 p.p.m., advantageously 2 to 100 p.p.m., based on the quantity of monomer.

The polymerization is carried out with the known radical-forming activator systems. These include hydrogen peroxide, persulfates, perphosphates, perborates, azo compounds and redox systems, such as mixtures of chlorate and bisulfite, persulfate and pyrosulfite, perborate and bisulfite, perphosphate and pyrosulfite, and persulfate and sulfur dioxide. Where salts are concerned, the potassium, sodium and ammonium salts are particularly suitable. It is preferred to use those redox systems in which the molar ratio between oxidizing agent and reducing agent is between 1:1 and 1:50, advantageously between 1:2 and 1:30. The total quantity of catalysts is between 0.2 and 107, calculated on the monomers to be polymerized.

The acrylonitrile polymers according to the invention can be prepared without difficulty with a K-value of 80–90 (Fikentscher, Cellulosechemie, 13 (1932), 58), this being especially suitable for spinning. The polymers can be dissolved in suitable solvents, such as dimethyl formamide, dimethyl acetamide, glycol carbonate, propylene glycol carbonate and also concentrated salt solutions in order to provide completely gelfree, colorless solutions, from which pure white filaments or fibers can be manufactured. Subsequent treatment for improving the color tone and also an additional bleaching step is thus no longer necessary for most intended uses. The polymers also show an improved thermostability. The main advantages of the process according to the invention consist in the short reaction time, the high degree of conversion and also the possibility of working in vessels which contain iron.

The invention is further disclosed in the following examples, which are illustrative but not limitative thereof.

*Example 1*

A solution of 2.86 parts by weight of metaphosphoric acid in 895 parts by weight of water is placed in a porcelain vessel. A mixture of 124 parts by weight of acrylonitrile and 6.5 parts by weight of methyl acrylate and also solutions of 2.6 parts by weight of potassium persulfate in 150 parts by weight of water and 3.5 parts by weight of sodium pyrosulfite in 150 parts by weight of water, 100 p.p.m. of ferrous sulfate are added at a temperature of 45° C. and over a period of 13 hours. After working-up, there are obtained 102 parts by weight of polymer, which has a very light color tone and also an excellent thermostability.

*Example 2*

620 parts by weight of salt-free water are placed in a stainless steel vessel and the pH-value thereof is adjusted to approximately 2 by adding 0.27 part by weight of metaphosphoric acid and 8.3 parts by weight of N-sulfuric acid. After the polymerization vessel has been thoroughly flushed with nitrogen and heated to 55° C., a mixture of 95 parts by weight of acrylonitrile and 4.5 parts by weight of methyl acrylate, as well as solutions each consisting of 100 parts by weight of salt-free water and 5.4 parts by weight of sodium pyrosulfite, 1.0 part by weight of potassium persulfate and 0.5 part by weight of methacryloyl aminobenzene benzenedisulfonimide are added dropwise over a period of six hours. The reaction is allowed to proceed for another hour, the polymer is separated from the aqueous phase, washed with salt-free water and dried at 60° C. in a drying chamber.

There are obtained 90 parts by weight of a pure white product, the molecular weight of which corresponds to a K-value of 84.7. Films which are manufactured from this polymer by casting a dimethyl formamide solution, remain practically colorless, even after being heated for three hours in an air stream to 165° C. In contrast thereto, films consisting of a material with a comparable K-value, but polymerized without the use of metaphosphoric acid, show a yellow coloring.

*Example 3*

250 parts by weight of acrylonitrile, 9.8 parts by weight of methyl acrylate and 4.2 parts by weight of methacryloyl aminobenzene benzenedisulfonimide in 2580 parts by weight of water, with addition of 0.078 part by weight of metaphosphoric acid and 8.95 parts by weight of chloroacetic acid, are polymerized as described in Example 2, using as activating agent 2.5 parts by weight of ammonium persulfate and 15.3 parts by weight of sodium pyrosulfite, with the addition of 10 p.p.m. of ferrous ions. Enamelled vessels are used as polymerization vessels. The polymerization is completed after nine hours. 227 parts by weight of polymer with a K-value of 91.3 are obtained. Solutions of this product in dimethyl formamide, and also films produced therefrom show an excellent stability under the action of relatively high temperatures and in the presence of air.

*Example 4*

In order to compare the thermostability of the acrylonitrile polymers prepared in the presence of condensed phosphoric acids and heavy metal compounds with those of polymers which are obtained with the use of orthophosphoric or pyrophosphoric acids, the following comparison experiments are carried out.

In each of four batches (A–D), 95 parts by weight of acrylonitrile, 4.5 parts by weight of methyl acrylate and 0.5 part by weight of methacryloyl aminobenzene benzenedisulfonimide are polymerized under conditions such as set out in detail in Example 2. The adjustment of the pH-value to 2–3 is effected in:

(A) With orthophosphoric acid,
(B) With pyrophosphoric acid,
(C) With metaphosphoric acid,
(D) With N-sulfuric acid/metaphosphoric acid (ratio by weight 8:0.5).

The following heavy metal compounds are added:

(A) No addition,
(B) 10 p.p.m. of copper sulfate, based on monomer,
(C) 100 p.p.m. of ferrous sulfate, based on monomer,
(D) 20 p.p.m. of ferrous sulfate, based on monomer.

All polymers show a comparable mean molecular weight, which is expressed by the K-value (see table). The testing of the polymers as regards their thermostability is carried out in solution and on films, as hereinafter described:

(I) 10 percent solutions of the polymers in dimethyl formamide are heated in the presence of air for six hours to 130° C. The degree of the discoloration of the solutions is determined by reference to a color scale, made up of iodine solutions of different concentrations. The color factor "α" characterizing the degree of the discoloration corresponds to the coloring of a solution of α mg. of iodine in 100 ml. of potassium iodide solution.

(II) 10 percent solutions of the polymers in dimethyl formamide are cast to form films having a thickness of 50μ. These films are heated for 1, 2 and 3 hours in an air stream to 170° C. The discoloration of the films is compared with an empirically formed yellow scale, increasing values of the color factor "β" thus obtained representing an increasing discoloration.

TABLE

| Experiment | Acid | Heavy Metal Compounds | Color Factor "β" | | | | K-value |
|---|---|---|---|---|---|---|---|
| | | | α | 1h | 2h | 3h | |
| A | Orthophosphoric acid | | 35 | 3 | 6 | 15 | 85 |
| B | Pyrophosphoric acid | 10 p.p.m. $CuSO_4 \cdot 5H_2O$ | 15 | 2 | 4 | 9 | 89 |
| C | Metaphosphoric acid | 100 p.p.m. $FeSO_4 \cdot 7H_2O$ | 5 | 1.2 | 1.5 | 2 | 88.5 |
| D | N-sulfuric acid/metaphosphoric acid (ratio by weight 8:0.5). | 20 p.p.m. $FeSO_4 \cdot 7H_2O$ | 7 | 1.5 | 2 | 2.5 | 84.5 |

It is clearly apparent from this table that the polymers according to the invention show a higher thermostability than those which are prepared in completely similar manner, but using orthophosphoric acid or pyrophosphoric acid instead of condensed phosphoric acids.

*Example 5*

222 parts by weight of water, 3.1 parts by weight of a 0.5 percent solution of metaphosphoric acid and 4.6 parts by weight of N-sulfuric acid are placed in a polymerization vessel. After the polymerization vessel has been thoroughly flushed with nitrogen 0.28 part by weight of potassium persulfate, dissolved in 44 parts by weight of water, and 0.76 part by weight of sodium pyrosulfite, dissolved in 48 parts by weight of water, are added. The polymerization vessel is now heated to 55° C. and a mixture of 133 parts by weight of acrylonitrile and 6.3 parts by weight of methyl acrylate, a solution of 1.12 parts by weight of potassium persulfate and 0.021 part by weight of metaphosphoric acid in 428 parts by weight of water, which is acidified with 6.4 parts by weight of N-sulfuric acid, and a solution containing 6.82 parts by weight of sodium pyrosulfite in 435 parts by weight of water, 0.7 part by weight of methacryloyl aminobenzene benzenedisulfonimide and 2 p.p.m. of ferrous ions in the form of $FeSO_4 \cdot 7H_2O$ (calculated on the monomers used), are run in at a uniform rate within three hours. The polymerization mixture is maintained to 55° C. for another hour and the precipitated polymer is then isolated. After drying in vacuum, 130 parts by weight of a pure, white product of a K-value of 84 is obtained.

*Example 6*

Polymerization is carried out as described in Example 5, however, using 3.78 parts by weight of sodium pyrosulfite, 1 p.p.m. of ferrous ions and in addition thereto 0.21 part by weight of thioethylene glycol. A pure, white polymer of the K-value 86.5 is obtained in a yield of 79%.

*Example 7*

The polymerization of 133 parts by weight of acrylonitrile, 6.3 parts by weight of methyl acrylate and 0.7 part by weight of the sodium salt of styrene sulfonic acid is carried out in the presence of 0.11 part by weight of metaphosphoric acid as described in Example 5. 1.14 parts by weight of potassium persulfate and 4.09 parts by weight of sodium pyrosulfite as well as 5 p.p.m. of ferrous ions (calculated on the monomers used), are added as catalyst and activator respectively. 115 parts by weight of a pure, white polymer having an excellent thermostability is obtained.

*Example 8*

The polymerization of 133 parts by weight of acrylonitrile, 6.3 parts by weight of methyl acrylate and 0.7 part by weight of methacryloyl aminobenzene benzenedisulfonimide is carried out as described in Example 5 in the presence of 0.04 part by weight of metaphosphoric acid. The polymerization medium is acidified to a pH-value of 2.3 by means of p-toluene sulfonic acid. 1.4 parts by weight of potassium persulfate, 7.5 parts by weight of sodium pyrosulfite and 2 p.p.m. of copper ions (calculated on the monomers used), are employed as catalyst and activator respectively. Upon heating to 150° C. the pure, white polymer is obtained in a yield of 91%, which shows only a weak tendency of becoming yellow.

*Example 9*

The polymerization of 95 parts by weight of acrylonitrile, 4.5 parts by weight of methyl acrylate and 0.5 part by weight of methacryloyl aminobenzene benzenedisulfonimide is carried out in the presence of 0.028 part by weight of polyphosphoric acid and the pH-value is adjusted to 2.3 by means of sulfuric acid. 1.0 part by weight of potassium persulfate and 5.4 parts by weight of sodium pyrosulfite as well as 3.2 p.p.m. copper sulfate (calculated on the monomers used), are employed as catalyst and activator respectively. A pure, white polymer with the K-value 75 is obtained after five hours.

*Example 10*

The polymerization of 133 parts by weight of acrylonitrile, 6.3 parts by weight of methyl acrylate and 0.7 part by weight of methacryloyl aminobenzene benzenedisulfonimide is carried out as described in Example 5 in the presence of 0.26 part by weight of trisodium polyphosphate. The polymerization medium is acidified to a pH of 2.3. 0.57 part by weight of potassium persulfate and 3.1 parts by weight of sodium pyrosulfite as well as 5 p.p.m. copper ions (calculated on the monomers used), are employed as catalyst and activator respectively. 120 parts by weight of a pure, white polymer with the K-value 96 is obtained after four hours.

We claim:

1. A method which comprises polymerizing a mixture of polymerizable monomers comprising about 80% acrylonitrile with up to about 20% by weight of a vinyl compound in an aqueous medium in the presence of between 0.2 and 10% based on the monomers of a water-soluble persulfate/pyro-sulfite redox system, said aqueous medium additionally containing in solution between 1 and 250 parts per million based on the monomers of a water-soluble heavy metal compound and 0.005 to 2 parts by weight referred to 100 parts by weight of the monomers of a water-soluble condensed phosphorus containing acid having at least 3 phosphorus atoms per molecule, under reaction conditions including a pH of said aqueous medium within the range of between 1.3 and 5 during the polymerization and a temperature of from 10 to 80° C.

2. Method according to claim 1 wherein said condensed phosphorus containing acid is a member selected from the group consisting of polyphosphoric acid, metaphosphoric acid, and isometaphosphoric acid.

3. A method which comprises polymerizing a mixture of polymerizable monomers comprising about 80% acrylonitrile with up to about 20% by weight of a monomer selected from the group consisting of methacrylate and methacryloylamino benzene benzenedisulfonimide in an aqueous medium in the presence of between 0.2 and 10% based on the monomers of a water-soluble persulfate/pyrosulfite redox system, said aqueous medium additionally containing in solution between 1 and 250 parts per million based on the monomers of a water-soluble heavy metal compound selected from the group consisting of ferrous sulfate and copper sulfate and 0.005 to 2 parts by weight referred to 100 parts by weight of the monomers of condensed metaphosphoric acid, under reaction conditions including a pH of said aqueous medium within the range of between 1.3 and 5 during the polymerization and a temperature of from 10 to 80° C.

4. Method according to claim 3 wherein the redox system consists of potassium persulfate and sodium pyrosulfite.

5. Method according to claim 3 wherein the redox system consists of ammonium persulfate and sodium pyrosulfite.

References Cited by the Examiner
UNITED STATES PATENTS

| | | | |
|---|---|---|---|
| 2,629,712 | 2/1953 | Stanin et al. | 260—85.5 |
| 2,777,832 | 1/1957 | Mallison | 260—85.5 |

JOSEPH L. SCHOFER, *Primary Examiner.*

LOUISE P. QUAST, LEON J. BERCOVITZ,
*Examiners.*